(12) United States Patent  
Sakamoto (10) Patent No.: US 8,929,449 B2  
(45) Date of Patent: Jan. 6, 2015

(54) MOTION VECTOR DETECTION APPARATUS, MOTION VECTOR DETECTION METHOD, AND COMPUTER-READABLE STORAGE MEDIUM

(75) Inventor: Daisuke Sakamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 381 days.

(21) Appl. No.: 13/187,983

(22) Filed: Jul. 21, 2011

(65) Prior Publication Data

US 2012/0027095 A1   Feb. 2, 2012

(30) Foreign Application Priority Data

Jul. 30, 2010  (JP) ................. 2010-172726

(51) Int. Cl.
```
H04N 7/26      (2006.01)
H04N 19/51     (2014.01)
H04N 19/533    (2014.01)
H04N 19/61     (2014.01)
H04N 19/16     (2014.01)
```
(52) U.S. Cl.  
CPC ........... *H04N 7/465* (2013.01); *H04N 7/26781* (2013.01); *H04N 7/50* (2013.01); *H04N 7/26218* (2013.01)  
USPC .................................................. 375/240.16

(58) Field of Classification Search  
CPC .......... H04N 7/26218; H04N 7/26781; H04N 7/465; H04N 7/50  
USPC ....................................................... 375/240.  
See application file for complete search history.

(56) References Cited

U.S. PATENT DOCUMENTS 7,551,673 B1 * 6/2009 Oh et al. .................. 375/240.16  
8,081,829 B2 * 12/2011 Aokage ........................ 382/238

FOREIGN PATENT DOCUMENTS

JP       2004-229150       8/2004

* cited by examiner

*Primary Examiner* — Andy Rao  
*Assistant Examiner* — Nguyen Truong  
(74) *Attorney, Agent, or Firm* — Cowan, Liebowitz & Latman, P.C.

(57) ABSTRACT

A motion vector detection apparatus comprising, a memory for storing a reference image for motion prediction encoding, a unit for detecting a first motion vector by comparing the reference image with an encoding target block of a plurality of blocks obtained by dividing a field image, a converter for converting the field image into a frame image by performing interlace/progressive conversion, a unit for generating a reduced image by reducing the frame image, a frame memory for storing the reduced image, and a unit for detecting a second motion vector based on a reference reduced image and a reduced image of the encoding target block of reduced images stored in the frame memory, wherein the second motion vector detected with respect to the reduced image of the encoding target block is used to determine a search area for detecting the first motion vector.

10 Claims, 5 Drawing Sheets

FIG. 1

MOTION VECTOR DETECTION APPARATUS, MOTION VECTOR DETECTION METHOD, AND COMPUTER-READABLE STORAGE MEDIUM

BACKGROUND OF THE INVENTION

1. Field of the Invention

The present invention relates to a motion vector detection apparatus, a motion vector detection method, and a computer-readable storage medium.

2. Description of the Related Art

In recent years, digitization of information associated with so-called multimedia such as audio signals and video signals is rapidly becoming common. Along with this, compression encoding/decoding techniques for video signals are receiving attention. Compression encoding/decoding techniques can reduce memory capacity necessary for storing video signals and bandwidth necessary for transmission, and is therefore extremely important for the multimedia industry.

Compression encoding/decoding techniques compress the information/data amount using high autocorrelation (that is, redundancy) present in most video signals. Redundancies of video signals include time and spatial redundancies. It is possible to decrease time redundancy using motion detection and compensation for each block. Furthermore, it is possible to decrease spatial redundancy using discrete cosine transformation (DCT).

In the MPEG scheme known as a compression encoding/decoding technique or the like, such methods decrease the redundancy of video signals, thereby improving the data compression effect of a video frame/field which varies with time. Motion estimation for each block for decreasing time redundancy is a task for finding a block most resembling that in a current frame/field among blocks in sequentially input reference frames/fields (previous frames/fields). A vector representing a moving direction and moving amount of a corresponding block is called motion vector. The motion detection is synonymous with motion vector detection. In such motion vector detection, a video signal is divided into blocks each consisting of m pixels×n lines (m and n are integers) and serving as a unit of motion vector detection (e.g., a macro block), and a motion vector is detected for each macro block. In motion vector detection, it is possible to use a block matching method disclosed in Japanese Patent Laid-Open No. 2004-229150, and the like.

SUMMARY OF THE INVENTION

To encode an interlaced video signal, motion detection is performed between fields. In this case, when motion vector detection is performed for an object having an oblique line with small motion as an edge, it is difficult to accurately recognize the motion. That is, a motion vector may be erroneously detected, resulting in video quality degradation after encoding.

The present invention provides a motion compensation encoding technique in which even if motion between field images is small when encoding an interlaced video signal, a motion vector is not erroneously detected and therefore video quality degradation hardly occurs.

According to one aspect of embodiments, the present invention relates to a motion vector detection apparatus comprising, a memory configured to store a reference image for motion prediction encoding; a motion vector search unit configured to detect a first motion vector by comparing the reference image stored in the memory with an encoding target block of a plurality of blocks obtained by dividing a field image, a converter configured to convert the field image into a frame image by performing interlace/progressive conversion, a reduced image generation unit configured to generate a reduced image by reducing the frame image, a frame memory configured to store the reduced image, and a pre-motion vector search unit configured to detect a second motion vector based on a reference reduced image and a reduced image of the encoding target block of reduced images stored in the frame memory, wherein the motion vector search unit uses the second motion vector detected with respect to the reduced image of the encoding target block to determine a search area for detecting the first motion vector with respect to the encoding target block divided from the field image.

Further features of the present invention will become apparent from the following description of exemplary embodiments (with reference to the attached drawings).

DESCRIPTION OF THE EMBODIMENTS

A detailed description will be given based on embodiments of the present invention with reference to the accompanying drawings.

[First Embodiment]

Figure 1:
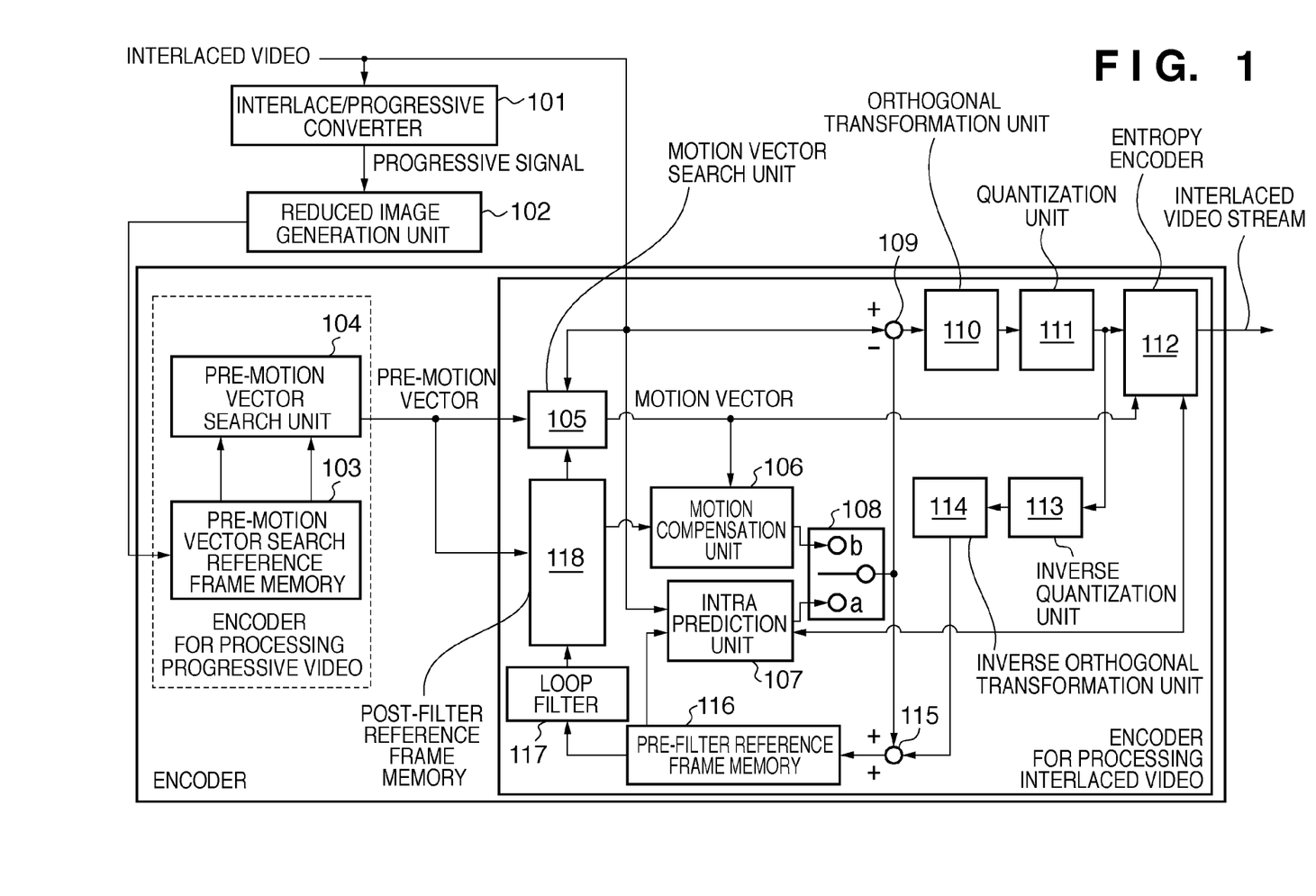
FIG. 1 is a block diagram showing an example of the arrangement of a motion compensation encoding apparatus according to the first embodiment.
Figure 5:
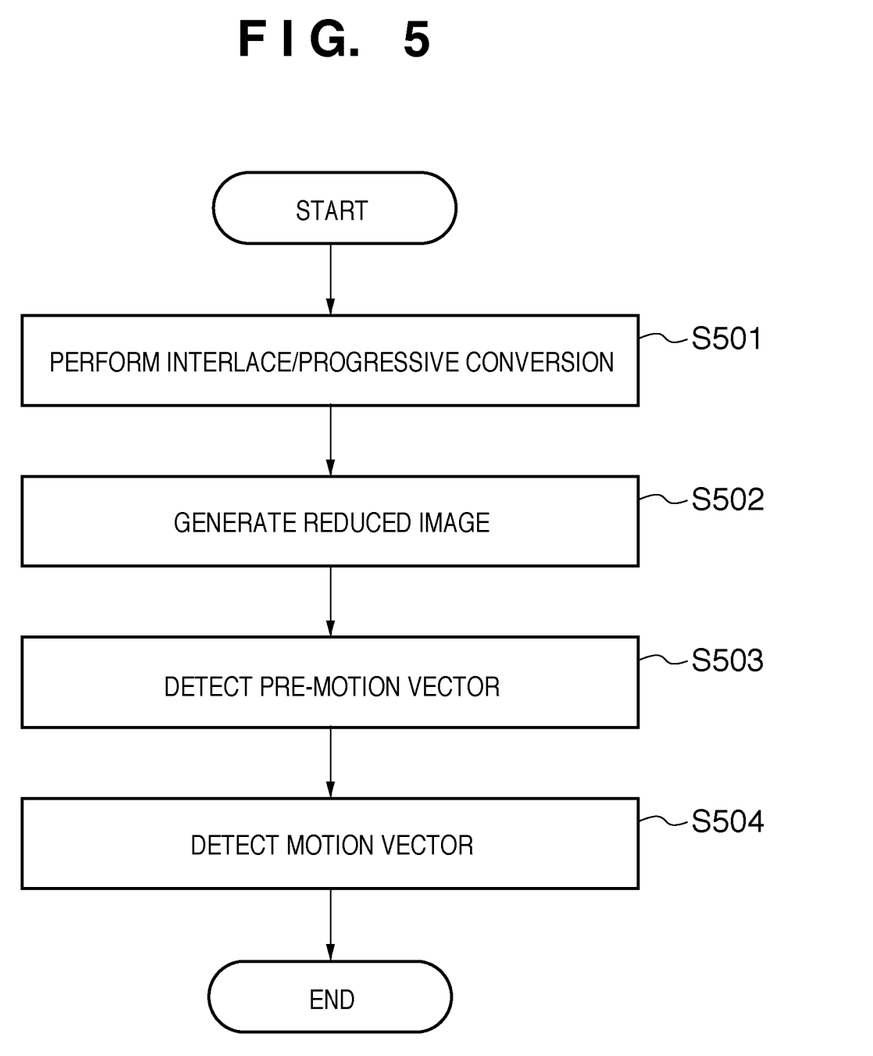
FIG. 5 is a flowchart illustrating motion vector detection processing according to the first embodiment.

With reference to FIGS. 1 and 5, an embodiment of a compensation encoding apparatus including a motion vector detection apparatus according to the present invention will be explained in detail. FIG. 1 is a block diagram showing a motion compensation encoding apparatus according to the present invention. FIG. 5 is a flowchart illustrating an example of motion vector detection processing according to the embodiment.

This embodiment is characterized by a technique for decreasing erroneous detection of a motion vector (the first motion vector) for performing motion compensation on an encoding target block (e.g., macro block) in a field image. More specifically, a field image is converted into a frame image to generate a reduced image, a pre-motion vector (the second motion vector) is detected with respect to the reduced image, and the second motion vector is used to search for the first motion vector.

Figure 2A:
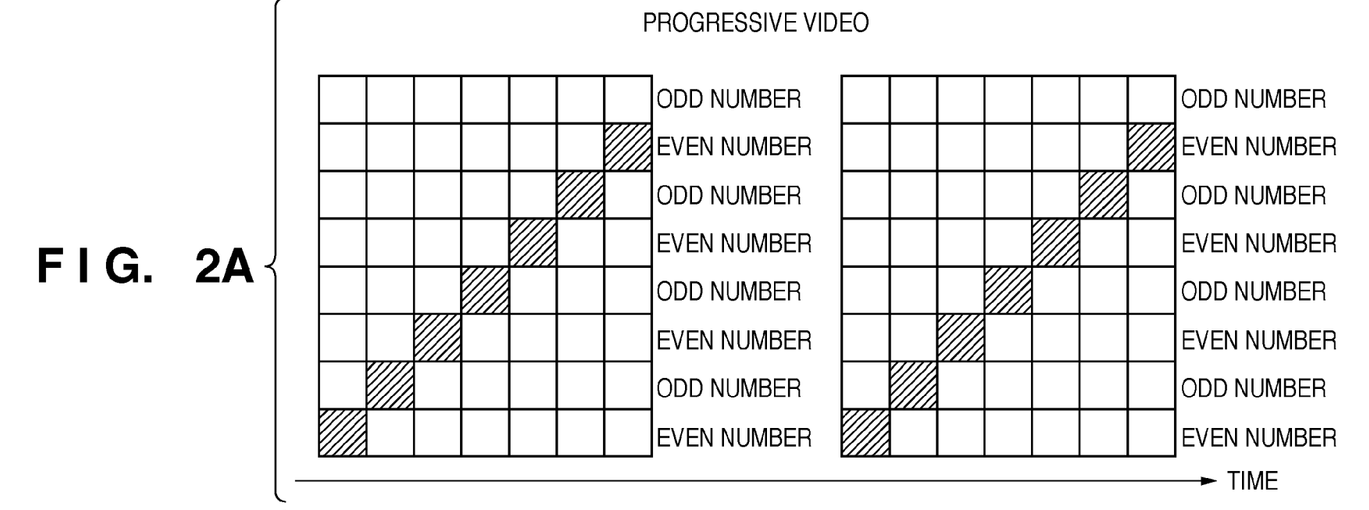
FIGS. 2A and 2B are views for explaining a problem when encoding an interlaced video signal.
Figure 2B:
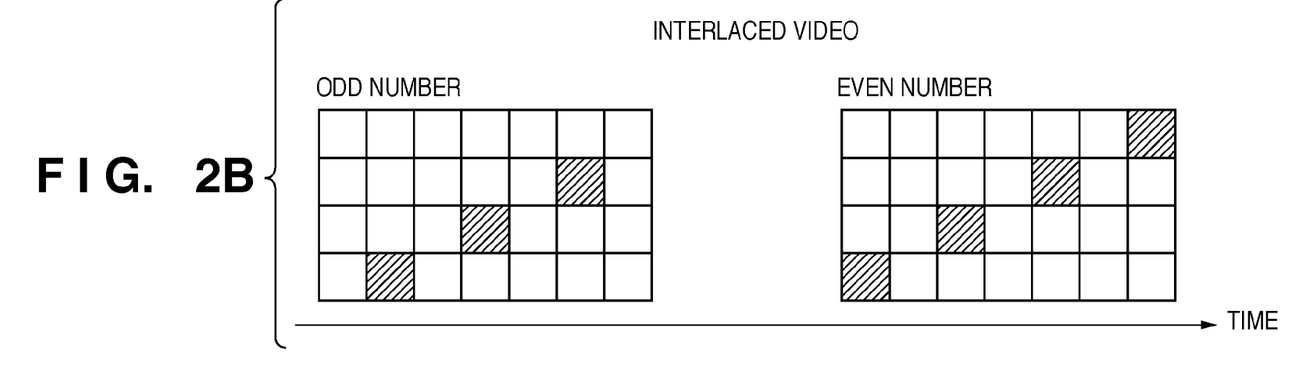

The reason why erroneous detection may occur in motion vector detection based on a field image will be described next with reference to oblique lines in still images shown in FIGS. 2A and 2B. As shown in FIG. 2A, when encoding a progressive video signal, video is processed as frames. In this case, the frames have the same pattern in the time direction, and oblique lines are present in the identical coordinates in the frames, thereby correctly detecting a motion vector to be "0". On the contrary, when encoding an interlaced video signal, video is processed as fields. In this case, as shown in FIG. 2B, patterns in even-numbered fields and odd-numbered fields are different from each other, and therefore, oblique lines are not present in identical coordinates across frames. This causes a detection error because the motion vector does not become "0". Consequently, when playing back encoded video, visual video quality degradation (image quality degradation) occurs.

Processing in the embodiment will be explained in detail using each component shown in FIG. 1. Each block of a motion compensation encoding apparatus 100 in FIG. 1 may be configured by a hardware component using a dedicated logic circuit or memory. Alternatively, each block may be configured by a software component when a CPU executes a processing program stored in a memory. The flowchart in FIG. 5 can be implemented when the CPU, functioning as a corresponding functional block, executes the corresponding program (stored in a ROM or the like).

In step S501, an interlace/progressive converter 101 converts an interlaced video signal into a progressive video signal, and then transmits it to a reduced image generation unit 102.

Figure 3:
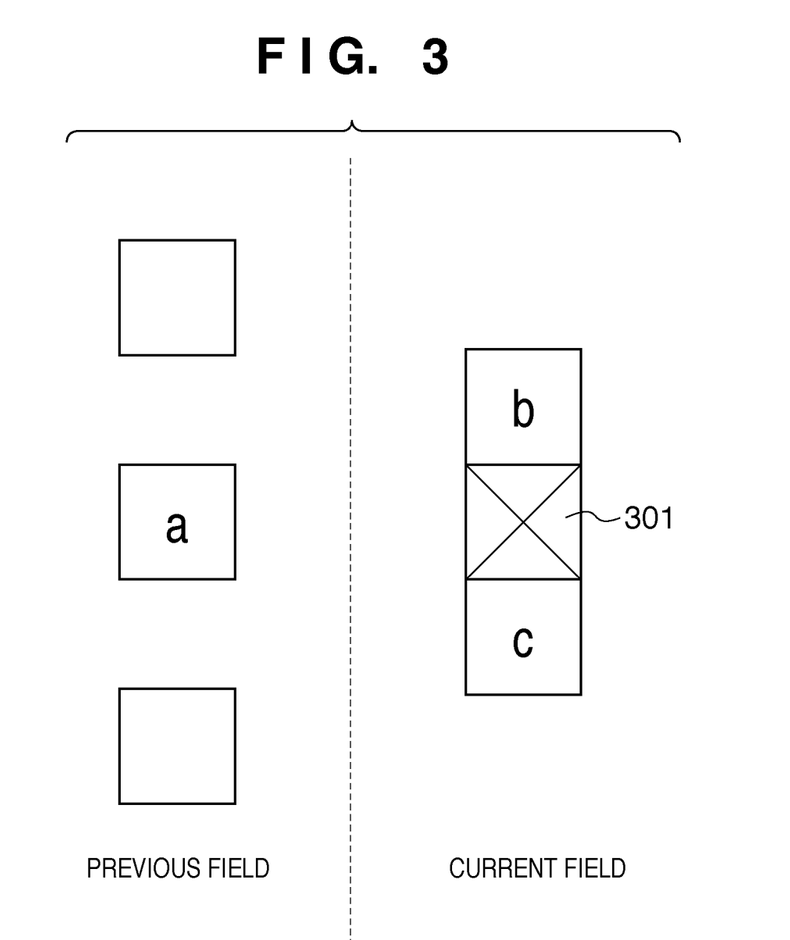
FIG. 3 is a view for explaining an interlace/progressive conversion scheme.

An example of the interlace/progressive conversion processing will be described with reference to FIG. 3. Note that any method of generating a progressive video signal is applicable. FIG. 3 shows a case in which identical coordinate positions are extracted for each pixel from each of two sequential field images (interlaced video signals). At this time, the coordinate positions are extracted by considering an interpolation target pixel (interpolation point) 301 of a current field as a center. To perform interlace/progressive conversion, whether there was motion of the interpolation pixel is determined using values at upper and lower positions of the interpolation point 301 of the current field, and a value at the same position as that of the interpolation point 301 of the current field in a previous field immediately before the current field. Note that b and c respectively represent the values at the upper and lower positions of the interpolation point 301 of the current field, and a represents the value at the same position as that of the interpolation point 301 of the current field in the previous field, as shown in FIG. 3. A difference value fdd between the fields is calculated using those values according to:

$$fdd=|a-(b+c)/2| \quad (1)$$

As fdd increases, the difference between the current and previous fields also increases, thereby determining that there was a motion. On the contrary, if fdd becomes small, the difference between the current and previous fields also becomes small, thereby indicating that there was no motion. For example, fdd is compared with a predetermined value (threshold TH1). If fdd>TH1, it is possible to determine that "there was motion"; otherwise, it is possible to determine that "there was no motion".

If it is determined that "there was no motion", the interpolation point is considered to have the same value as that in the previous field, and the value ("a" in FIG. 3) in the previous field is substituted intact. This interpolation processing method is called "inter-field interpolation". If it is determined in the motion determination processing that "there was motion", the interpolation point has a value independent of the value in the previous field. Therefore, an average value ((b+c)/2 in FIG. 3) of the upper and lower pixel values in the current field is set to an interpolation value. This interpolation processing method is called "intra-field interpolation".

In step S502, the reduced image generation unit 102 generates a reduced image. As a method of generating a reduced image, a method of using an average value of pixel values of two pixels successively arranged in the vertical direction and four pixels successively arranged in the horizontal direction when reducing an image to ½ in the vertical direction and ¼ in horizontal direction may be used but any other method is also applicable. Note that in this embodiment, a case in which an image is reduced to ½ in the vertical direction and ¼ in the horizontal direction will be described as an example.

A pre-motion vector search reference frame memory 103 stores reduced images of progressive video sent from the reduced image generation unit 102 in a display order, and sequentially transmits encoding target blocks to a pre-motion vector search unit 104 in an encoding order. The memory 103 also stores the reduced images of the progressive video as reference reduced images for searching for pre-motion vectors, and sequentially transmits them to the pre-motion vector search unit 104. Note that since pre-motion vector search is performed for a reduced image of progressive video, it is performed by adjusting the size of an encoding target block to the size of a reduced image.

In this embodiment, since the progressive video signal is reduced to ½ in the vertical direction and ¼ in the horizontal direction, the video signal is increased twofold in the vertical direction, and then a block reduced to ½ in the vertical direction and ¼ in the horizontal direction, that is, a block reduced to ¼ in the horizontal direction is used. For example, since the size of an encoding target block in MPEG2 is 16×16 pixels, pre-motion vector search is performed using a block with a size of 4×16 pixels.

The pre-motion vector search unit 104 searches for a pre-motion vector in step S503. In this case, vector detection is performed based on the position at which correlation is strong between an encoding target macro block from the pre-motion vector search reference frame memory 103 and a reference image from the pre-motion vector search reference frame memory 103.

To estimate a motion vector having the strongest correlation, an evaluation function such as MSE (Mean Square Error) (equation 2), MAE (Mean Absolute Error) (equation 3), or MAD (Mean Absolute Difference) is used.

$$MSE(i,j,k) = \frac{1}{UV} \sum_{u=0}^{U} \sum_{v=0}^{V} [S_{cur,k}(x,y) - S_{ref}(x+i, y+j)] \quad (2)$$

$$MAE(i,j,k) = \frac{1}{UV} \sum_{u=0}^{U} \sum_{v=0}^{V} |S_{cur,k}(x,y) - S_{ref}(x+i, y+j)| \quad (3)$$

where $S_{ref}$ represents a reference image, and $S_{cur,k}$ represents the kth macro block in the current frame. Furthermore, (i, j) indicates the spatial position of a reference image for the kth macro block in the current frame.

Assume that X represents the number of pixels arranged in the horizontal direction in a search window and Y represents the number of pixels arranged in the vertical direction in the search window. In this case, x=g×u and y=h×v where g and h are natural numbers satisfying 0≤x≤X, 1≤g≤X, 0≤y≤Y, and 1≤h≤Y. Moreover, U and V satisfy X−g≤U≤X and Y−h≤V≤Y.

The evaluation functions are based on the difference between pixels. A vector having the smallest MAE value or MSE value is selected as a pre-motion vector in a current macro block. Note that since pre-motion vector search is performed using a reduced image of progressive video, the size of the reduced image needs to be the same as the image size of the interlaced video. In this embodiment, a detected pre-motion vector is increased fourfold in the horizontal direction. Thereafter, the determined pre-motion vector is transmitted to a motion vector search unit 105 and a post-filter reference frame memory 118.

The motion vector search unit 105 searches for a motion vector in step S504. Note that the unit 105 searches for a vector using the pre-motion vector from the pre-motion vector search unit 104 based on a position at which correlation between an encoding target macro block and a reference image from the post-filter reference frame memory 118 becomes strong. More specifically, the unit 105 may narrow, based on the pre-motion vector, an area of the reference image to undergo motion vector search processing, or may acquire a reference image shifted by the pre-motion vector from the post-filter reference frame memory 118. Alternatively, the unit 105 may perform both the above processes to acquire a reference image shifted by the pre-motion vector, and then further narrow a search area within the reference image.

To estimate a motion vector having the strongest correlation, an evaluation function such as MSE or MAD described above is used, like a pre-motion vector. A vector having a smallest MAE value or MSE value is selected as a motion vector in a current macro block. Note that since motion search is performed using interlaced video intact, the size of a block and the magnitude of a motion vector need not be adjusted, unlike pre-motion vector search.

Information about the determined motion vector is sent to a motion compensation unit 106 and an entropy encoder 112. At the same time, reference image identification information used for generating the motion information is also sent to the motion compensation unit 106 and the entropy encoder 112.

As described above, the interlace/progressive converter 101, reduced image generation unit 102, pre-motion vector search reference frame memory 103, and pre-motion vector search unit 104 are used to detect the pre-motion vector as the second motion vector. Then, the motion vector search unit 105 and post-filter reference frame memory 118 can use the pre-motion vector to detect a motion vector as the first motion vector. These components can constitute the motion vector detection apparatus according to this embodiment.

An intra prediction unit 107 divides the reconstructed image data in a pre-filter reference frame memory 116 into blocks of a predetermined size, and predicts reconstructed image data within each block based on the values of the pixels surrounding the block. The unit 107 calculates the predicted value as predicted image information, and sends it to a switch 108. The switch 108 is switched depending on a prediction method by a controller (not shown). In the case of an intra prediction encoding scheme, the switch is connected to a position 108a, and data obtained by a calculation method based on the intra prediction method is sent as predicted image information.

The motion compensation unit 106 reads out a reconstructed image for the reference image corresponding to the reference frame identification information from the post-filter reference frame memory 118, and generates predicted image information of a current image based on the reconstructed image data and the motion vector. As described above, an inter prediction encoding scheme is different from the intra prediction encoding scheme in that predicted image information is generated with reference to a frame different from the current image.

Predicted image information generated in the inter prediction encoding scheme is connected to a position 108b using the switch 108, and data obtained by a calculation method based on the inter prediction method is sent as predicted image information. A subtracter 109 subtracts, from an encoding target block, a predicted image block transmitted from the switch 108, and outputs image residual data. An orthogonal transformation unit 110 performs orthogonal transformation processing for the image residual data output from the subtracter 109, and then transmits a transformation coefficient to a quantization unit 111.

The quantization unit 111 uses a predetermined quantization parameter to quantize the transformation coefficient transmitted from the orthogonal transformation unit 110, and transmits the quantized transformation coefficient to the entropy encoder 112 and an inverse quantization unit 113. The entropy encoder 112 inputs the transformation coefficient quantized by the quantization unit 111, performs entropy encoding such as CAVLC or CABAC, and then outputs the result as encoded data.

Next, a method for generating a reference image using the transformation coefficient quantized by the quantization unit 111 will be described. The inverse quantization unit 113 inverse quantizes the quantized transformation coefficient transmitted from the quantization unit 111. An inverse orthogonal transformation unit 114 inverse orthogonal transforms the transformation coefficient inverse quantized by the inverse quantization unit 113 to generate decoded residual data, and transmits it to an adder 115. The adder 115 adds the decoded residual data to predicted image data (to be described later) to generate a reference image, and stores it in a pre-filter reference frame memory 116. The adder 115 also transmits the reference image to a loop filter 117. Note that the reconstructed image data at this time has lower quality than that of the input image data due to a predicted information error or a quantization error in the quantization processing.

The loop filter 117 performs predetermined filtering processing for pixel data adjacent to the boundaries of a block, thereby suppressing discontinuity of data at the boundaries of the block. As described above, the reconstructed image data has lower quality than that of the input image. In image data processed for each block in each process, discontinuity of data is likely to occur at the boundaries of the block, and this is recognized as block noise. To reduce block noise, a deblocking filter is used. The reconstructed image data that has undergone the boundary processing is stored in the post-filter reference frame memory 118.

As described above, even when encoding interlaced video, by using progressive video in upper layer motion vector search in layered motion vector search, it is possible to decrease erroneous detection of a motion vector even in video whose motion is small.

[Second Embodiment]

Figure 4:
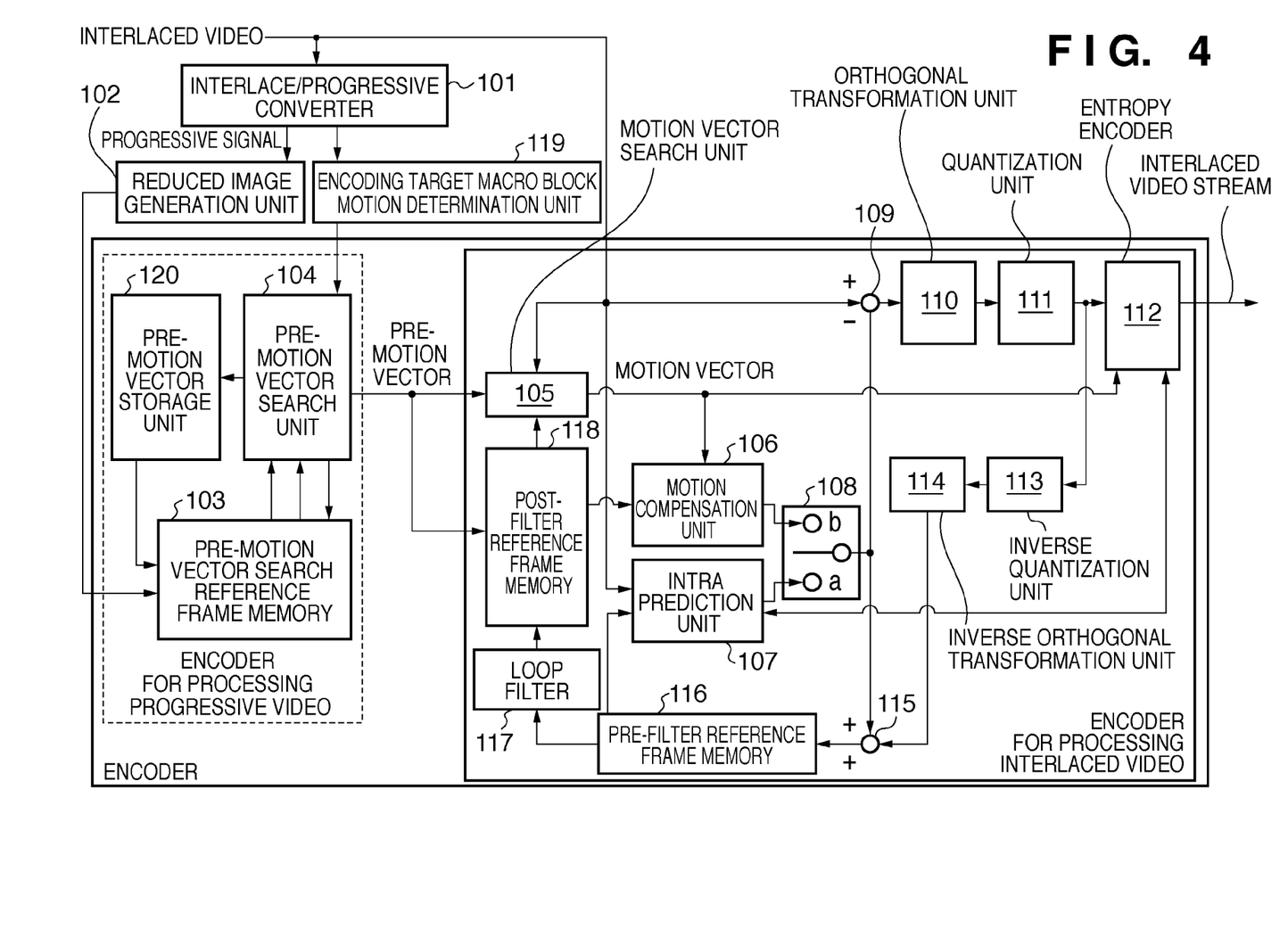
FIG. 4 is a block diagram showing an example of the arrangement of a motion compensation encoding apparatus according to the second embodiment.

With reference to a block diagram in FIG. 4, another embodiment of a motion vector detection apparatus according to the present invention will be described in detail. A motion vector detection apparatus of a motion compensation encoding apparatus 100 according to the second embodiment shown in FIG. 4 has almost the same arrangement as in the first embodiment but also has an encoding target macro block motion determination unit 119 and pre-motion vector storage unit 120. This embodiment is different from the first embodiment in that a motion determination result of an interlace/progressive converter 101 is transmitted to the encoding target macro block motion determination unit 119, and a motion vector search method of a pre-motion vector search unit 104 is switched depending on an encoding target macro block motion determination result.

The operations of components except for the interlace/progressive converter 101, pre-motion vector search unit 104, encoding target macro block motion determination unit 119, and pre-motion vector storage unit 120 are the same as in the first embodiment, and a description thereof will be omitted.

The interlace/progressive converter 101 determines interlace/progressive conversion target pixel motion using equation 1 used in the first embodiment, and transmits a determination result to the encoding target macro block motion determination unit 119. The encoding target macro block motion determination unit 119 receives the motion determination result from the interlace/progressive converter 101, and determines the encoding target macro block motion, and then transmits the determination result to the pre-motion vector search unit 104.

An encoding target macro block motion determination method will be explained below. The encoding target macro block motion determination unit 119 receives the motion determination result from the interlace/progressive converter 101, and counts the number of pixels in the encoding target macro block, for which it is determined that there was a motion. Assume that the count is indicated by $MV_{cnt}$. Whether the encoding target block moved is determined using $$MV_{cnt} \geq TH2 \qquad (4\text{-}1)$$

$$MV_{cnt} < TH2 \qquad (4\text{-}2)$$

where TH2 represents a predetermined threshold. If the inequality 4-1 holds, the number of moved pixels is determined to be large, and it is therefore determined that the encoding target macro block moved. On the other hand, if inequality 4-2 holds, the number of moved pixels is determined to be small, and it is therefore determined that the encoding target macro block did not move.

The pre-motion vector search unit 104 changes a search position depending on the encoding target macro block motion determination result transmitted from the encoding target macro block motion determination unit 119 to search for a motion vector. If it is determined that the encoding target macro block did not move, the unit 104 determines a search area based on the position of the encoding target macro block, and requests a reference image of a pre-motion vector search reference frame memory 103. The unit 104 then uses the obtained reference image to perform a motion search around the encoding target macro block.

Alternatively, if it has been determined that there was a motion, the unit 104 determines the search area based on the position of the encoding target macro block and a pre-motion vector (to be referred to as a "prediction motion vector") obtained in the surrounding macro block. The unit 104 requests a reference image of the pre-motion vector search reference frame memory 103. Note that the surrounding macro block includes, for example, a macro block which has undergone pre-motion vector detection, and is adjacent to the encoding target macro block. If there are a plurality of targets surrounding macro blocks, the result obtained by combining a plurality of pre-motion vectors can be used as a prediction motion vector. As described above, the pre-motion vector search unit 104 shifts a search position by the prediction motion vector to perform motion search. As in the first embodiment, MSE, MAE, or MAD is obtained. A vector with the smallest MAE value or MSE value is selected as a pre-motion vector in a current macro block.

Since pre-motion vector search is performed using a reduced image of progressive video, it is necessary to adjust the size of the reduced image to the image size of interlaced video. In this embodiment, a detected pre-motion vector is enlarged fourfold in the horizontal direction. The determined pre-motion vector is then transmitted to a motion vector search unit 105 and a post-filter reference frame memory 118. The pre-motion vector is also transmitted to the pre-motion vector storage unit 120 within the pre-motion vector search unit. Subsequent encoding processing is the same as in the first embodiment, and a description thereof will be omitted.

In this embodiment, a position where movement is expected is specified using a pre-motion vector obtained in a surrounding macro block. However, other methods may also be used. For example, instead of the encoding the target macro block motion determination unit 119 and the pre-motion vector storage unit 120, there may be provided a global vector search unit which indicates a spatial difference (that is, a shift amount between fields) of an encoding target image with respect to a reference image. The global vector search unit detects a global vector, and outputs it to the pre-motion vector search unit 104. The pre-motion vector search unit 104 may search for a pre-motion vector at a position shifted from an encoding target macro block by the global vector.

To detect a global vector, it is possible to use an evaluation function such as MSE (Mean Square Error), MAE (Mean Absolute Error), or MAD (Mean Absolute Difference) like a motion vector. Examples of the evaluation function using MSE and MAE are given by $$MSE(i, j) = \frac{1}{QR}\sum_{q=0}^{Q}\sum_{r=0}^{R}[S_{cur}(m+i, n+j) - S_{ref}(m, n)]^2 \qquad (5)$$

$$MAE(i, j) = \frac{1}{QR}\sum_{q=0}^{Q}\sum_{r=0}^{R}|S_{cur}(m+i, n+j) - S_{ref}(m, n)| \qquad (6)$$

where $S_{cur}(m, n)$ represents the (m, n)th pixel value in a current frame, and $S_{ref}(m, n)$ represents the (m, n)th pixel value in a reference image. Furthermore, (i, j) indicates a spatial position of the current frame with respect to the reference image.

Assume that M represents the number of pixels arranged in the horizontal direction in one frame, and N represents the number of pixels arranged in the vertical direction in one frame. In this case, m=k×q and n=l×r where k and l are natural numbers satisfying 0≤m≤M, 1≤k≤M, 0≤n≤N, and 1≤l≤N. Furthermore, Q and R satisfy M−k≤Q≤M and N−l≤R≤N.

As described above, in this embodiment, if an encoding target block does not move, pre-motion vector search is performed around an encoding target macro block; otherwise, pre-motion vector search is performed at a position where it is expected that there is motion. This makes it possible to decrease the probability of erroneously detecting a motion vector.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No 2010-172726, filed Jul. 30, 2010, which is hereby incorporated by reference herein in its entirety.

What is claimed is:

1. An apparatus comprising:
a converter that generates a progressive image from a first field image and a second field image prior to the first field image by using a conversion method, wherein the conversion method includes (a) determining a difference between an average value of pixels at both sides of a first pixel in the first field image and a pixel value of a second pixel which is in the second field image and corresponds to the first pixel, (b) generating the first pixel based on the average value to generates the progressive image if the difference exceeds a predetermined value, and (c) generating the first pixel based on the second pixel to generates the progressive image if the difference does not exceed the predetermined value;
a reduced image generating unit that generates a reduced image from the progressive image;
a second motion vector detecting unit that detects a second motion vector based on the reduced image; and
a first motion vector detecting unit that detects, from a search area, a first motion vector corresponding to a target block included in the first field image, wherein the search area is determined based on the second motion vector.

2. The apparatus according to claim 1, wherein the first motion vector detecting unit determines the search area by narrowing down, based on the second motion vector, an area for searching the first motion vector.

3. The apparatus according to claim 1, wherein the first motion vector detecting unit determines the search area by shifting, based on the second motion vector, an area for searching the first motion vector.

4. A non-transitory computer readable storage medium that stores a program for causing a computer to execute a method, the method comprising:
generating a progressive image from a first field image and a second field image prior to the first field image by using a conversion method, wherein the conversion method includes (a) determining a difference between an average value of pixels at both sides of a first pixel in the first field image and a pixel value of a second pixel which is in the second field image and corresponds to the first pixel, (b) generating the first pixel based on the average value to generates the progressive image if the difference exceeds a predetermined value, and (c) generating the first pixel based on the second pixel to generates the progressive image if the difference does not exceed the predetermined value;
generating a reduced image from the progressive image;
detecting a second motion vector based on the reduced image; and
detecting, from a search area, a first motion vector corresponding to a target block included in the first field image, wherein the search area is determined based on the second motion vector.

5. A method comprising:
generating a progressive image from a first field image and a second field image prior to the first field image by using a conversion method, wherein the conversion method includes (a) determining a difference between an average value of pixels at both sides of a first pixel in the first field image and a pixel value of a second pixel which is in the second field image and corresponds to the first pixel, (b) generating the first pixel based on the average value to generates the progressive image if the difference exceeds a predetermined value, and (c) generating the first pixel based on the second pixel to generates the progressive image if the difference does not exceed the predetermined value;
generating a reduced image from the progressive image;
detecting a second motion vector based on the reduced image; and
detecting, from a search area, a first motion vector corresponding to a target block included in the first field image, wherein the search area is determined based on the second motion vector.

6. An apparatus comprising:
a converter that generates a progressive image from a first field image and a second field image prior to the first field image by using a conversion method, wherein the conversion method includes (a) determining a difference between an average value of pixels at both sides of a first pixel in the first field image and a pixel value of a second pixel which is in the second field image and corresponds to the first pixel, (b) generating the first pixel based on the average value to generates the progressive image if the difference exceeds a predetermined value, and (c) generating the first pixel based on the second pixel to generates the progressive image if the difference does not exceed the predetermined value;
a second motion vector detecting unit that detects a second motion vector based on the progressive image; and
a first motion vector detecting unit that detects, from a search area, a first motion vector corresponding to a target block included in the first field image, wherein the search area is determined based on the second motion vector.

7. The apparatus according to claim 6, wherein the first motion vector detecting unit determines the search area by narrowing down, based on the second motion vector, an area for searching the first motion vector.

8. The apparatus according to claim 6, wherein the first motion vector detecting unit determines the search area by shifting, based on the second motion vector, an area for searching the first motion vector.

9. A non-transitory computer readable storage medium that stores a program for causing a computer to execute a method, the method comprising:
generating a progressive image from a first field image and a second field image prior to the first field image by using a conversion method, wherein the conversion method includes (a) determining a difference between an average value of pixels at both sides of a first pixel in the first field image and a pixel value of a second pixel which is in the second field image and corresponds to the first pixel, (b) generating the first pixel based on the average value to generates the progressive image if the difference exceeds a predetermined value, and (c) generating the first pixel based on the second pixel to generates the progressive image if the difference does not exceed the predetermined value;
detecting a second motion vector based on the progressive image; and
detecting, from a search area, a first motion vector corresponding to a target block included in the first field image, wherein the search area is determined based on the second motion vector.

10. A method comprising:

generating a progressive image from a first field image and a second field image prior to the first field image by using a conversion method, wherein the conversion method includes (a) determining a difference between an average value of pixels at both sides of a first pixel in the first field image and a pixel value of a second pixel which is in the second field image and corresponds to the first pixel, (b) generating the first pixel based on the average value to generates the progressive image if the difference exceeds a predetermined value, and (c) generating the first pixel based on the second pixel to generates the progressive image if the difference does not exceed the predetermined value;

detecting a second motion vector based on the progressive image; and detecting, from a search area, a first motion vector corresponding to a target block included in the first field image, wherein the search area is determined based on the second motion vector.

\* \* \* \* \*